US012746098B2

(12) United States Patent
Wang et al.

(10) Patent No.: US 12,746,098 B2
(45) Date of Patent: Sep. 29, 2026

(54) ROTATABLE ULTRASONIC VIBRATION DEVICE

(71) Applicant: Shenzhen Superline Technology Co., Ltd., Shenzhen City (CN)

(72) Inventors: Zhong Wang, Shenzhen City (CN); Jinsong Zhou, Shenzhen City (CN)

(73) Assignee: SHENZHEN SUPERLINE TECHNOLOGY CO., LTD., Shenzhen City (CN)

( * ) Notice: Subject to any disclaimer, the term of this patent is extended or adjusted under 35 U.S.C. 154(b) by 91 days.

(21) Appl. No.: 18/739,835

(22) Filed: Jun. 11, 2024

(65) Prior Publication Data

US 2025/0082435 A1 Mar. 13, 2025

(30) Foreign Application Priority Data

Sep. 12, 2023 (CN) ......................... 202311176770.7

(51) Int. Cl.
*A61C 1/07* (2006.01)
*A61C 1/14* (2006.01)
*A61C 1/18* (2006.01)

(52) U.S. Cl.
CPC ................ *A61C 1/07* (2013.01); *A61C 1/144* (2013.01); *A61C 1/185* (2013.01)

(58) Field of Classification Search
CPC .. A61C 1/07; A61C 1/148; A61C 1/12; A61C 1/14; A61C 1/141; A61C 1/142; A61C 1/144; A61C 3/03; A61C 5/40; A61C 5/42; A61C 5/44; A61C 17/16; A61C 17/20; A61C 17/32; A61C 17/3472; A61C 17/3481
See application file for complete search history.

(56) References Cited

U.S. PATENT DOCUMENTS

2015/0216551 A1* 8/2015 Dieras ............ A61B 17/320068 606/169

FOREIGN PATENT DOCUMENTS

CN 102151867 A 8/2011
CN 106179929 A 12/2016
(Continued)

OTHER PUBLICATIONS

First Office Action dated Jul. 25, 20215 received in Chinese Patent Application No. 202311176770.7.

*Primary Examiner* — Edward Moran
(74) *Attorney, Agent, or Firm* — Scully, Scott, Murphy & Presser, P.C.

(57) ABSTRACT

Disclosed is a rotatable ultrasonic vibration device. The ultrasonic vibration device includes: a shell; a hollow locking rod having a center hole; a piezoelectric transducer surrounding the hollow locking rod; a first amplitude-change pole mounted in the center hole, one end of the first amplitude-change pole being fixedly connected to the hollow locking rod, and at least a portion of the length of the first amplitude-change pole being located in the space surrounded by the piezoelectric transducer; an instrument rod connected to the other end of the first amplitude-change pole, an instrument working portion being located outside the shell and connected to the instrument rod, and the instrument rod being rotatable relative to the first amplitude-change pole; and a rotation transmission assembly rotatably mounted on the shell and matched with the instrument rod to transmit rotation torque to the instrument rod.

11 Claims, 5 Drawing Sheets

(56) References Cited

FOREIGN PATENT DOCUMENTS

| | | | |
|---|---|---|---|
| CN | 113057744 | * | 7/2021 |
| CN | 214682735 | * | 11/2021 |
| DE | 10250741 | A1 | 5/2004 |

* cited by examiner

ROTATABLE ULTRASONIC VIBRATION DEVICE

CROSS REFERENCE TO RELATED APPLICATION

The present application claims the priority to Chinese Patent Application No. 202311176770.7 filed with CNIPA on Sep. 12, 2023, the entire contents of which are incorporated herein by reference.

TECHNICAL FIELD

The present application belongs to the field of dental medical equipment, and in particular, relates to a rotatable ultrasonic vibration device.

BACKGROUND

Vibration and rotation structures on handles of conventional medical devices are all driven by pneumatic, electromagnetic, and mechanical means. As a result, relatively low vibration frequencies are generated, causing discomfort for subjects and potentially affecting the treatment effect.

SUMMARY

The present application aims to solve at least one of the technical problems in existing technologies. Therefore, the present application provides a rotatable ultrasonic vibration device that enhances the vibration performance to improve the treatment effect.

A rotatable ultrasonic vibration device according to embodiments of the present application includes: a shell with a mounting cavity in the shell, a handle connecting portion on the shell, and a mounting hole communicating with the mounting cavity; a hollow locking rod mounted in the mounting cavity, with one end of the hollow locking rod in a length direction thereof facing the mounting hole, and having a center hole in the length direction; a piezoelectric transducer mounted in the mounting cavity and surrounding the hollow locking rod, with the hollow locking rod fixing the piezoelectric transducer within the shell; a first amplitude-change pole mounted in the center hole, fixedly connected to the hollow locking rod at one end of the first amplitude-change pole in a length direction thereof, and with at least a portion of the length of the first amplitude-change pole located in the space surrounded by the piezoelectric transducer; an instrument rod, directly or indirectly connected to the other end of the first amplitude-change pole in the length direction thereof, with an instrument working portion located outside the shell and connected to the instrument rod, and the instrument rod being rotatably connected relative to the first amplitude-change pole; and a rotation transmission assembly, rotatably mounted on the shell, matched with the instrument rod to transmit rotation torque to the instrument rod.

In the ultrasonic vibration device according to the embodiments of the present application, the shell is disposed to house internal components, with the handle connecting portion on the shell to attach a handle body. The shell's own weight, combined with the additional weight from the connected handle body, allows the shell to function as a counterbalance mass, thereby reducing the structural volume by eliminating the need for a separate mass balance block. The radial arrangement of the shell, the piezoelectric transducer, the hollow locking rod, and the first amplitude-change pole is advantageous for significantly reducing the axial length of the ultrasonic vibration device, saving space, and enabling a compact design. Moreover, the piezoelectric transducer encases the radial outer side of the first amplitude-change pole, which is a hollow pole, to enhance the reception of ultrasonic energy. This results in a greater amplitude under the action of ultrasonic waves, ensuring high-intensity vibrations of the instrument working portion and improving energy utilization efficiency. The instrument rod benefits from a dual power source, significantly increasing the vibration frequency and amplitude of the instrument working portion, which is conducive to enhancing the treatment effect.

In some embodiments, the first amplitude-change pole is hollow; and the ultrasonic vibration device further includes a second amplitude-change pole mounted in the first amplitude-change pole. At least a portion of the second amplitude-change pole is located in the space surrounded by the piezoelectric transducer, with one end of the second amplitude-change pole in a length direction fixedly connected to the first amplitude-change pole and the other end fixedly connected to the instrument rod.

In some embodiments, the instrument rod includes an internal segment and a step positioning segment. The internal segment is disposed within the first amplitude-change pole, with one end of the internal segment fitting with the rotation transmission assembly. The step positioning segment is connected to the other end of the internal segment and is located outside the first amplitude-change pole, with the instrument working portion and the internal segment located on two opposite sides of the step positioning segment.

The ultrasonic vibration device further includes a pressing elastic member, which is matched with the shell and the instrument rod, respectively, to press the step positioning segment against an end of the first amplitude-change pole.

For example, the ultrasonic vibration device further includes a pre-tightening cover located outside the mounting cavity and connected to the shell, with a fitting hole through which one end of the instrument rod extends. The pressing elastic member includes a spring, with one end abutting against the pre-tightening cover and the other end against the step positioning segment.

Further, one end of the hollow locking rod extends from the mounting hole outside the shell. The ultrasonic vibration device further includes a pressure cover located outside the shell and fastened to the hollow locking rod to clamp the piezoelectric transducer, with the pre-tightening cover threadably engaged with the pressure cover to provide necessary pre-tightening force for the piezoelectric transducer.

In some embodiments, the instrument rod further includes an instrument amplitude-change pole segment located outside the first amplitude-change pole, and wherein the instrument working portion is rigidly connected to the instrument amplitude-change pole segment.

A notch can be disposed at one end of the hollow locking rod, and one end of the center hole is continuous with the notch.

A first flange is disposed within the notch at one end of the first amplitude-change pole, and the first flange is rigidly connected to the hollow locking rod.

In some optional embodiments, the rotation transmission assembly includes a first gear, which is mounted on the hollow locking rod via a first support bearing.

The portion of the instrument rod distant from the instrument working portion serve as a transmission segment. A central transmission hole of the first gear is provided to engage with the transmission segment, and the transmission hole is a non-circular hole.

Further, the handle connecting portion is provided with an accommodating groove, and the ultrasonic vibration device further includes a torque input shaft. The rotation transmission assembly further includes a second gear connected to the torque input shaft. The second gear is supported by a second support bearing within the accommodating groove and meshes with the first gear.

Further optionally, the axes of the first gear and the second gear are perpendicular to each other; an outer periphery of the first gear surrounds a radial outer side of the hollow locking rod, and the first support bearing is located between the outer edge of the first gear and the hollow locking rod.

In some embodiments, the pole portion of the first amplitude-change pole is a first model pole or a second model pole.

Similarly, the pole portion of the second amplitude-change pole is a first model pole or a second model pole.

The instrument amplitude-change pole segment is also a first model pole or a second model pole.

The first model pole has a linearly decreasing outer diameter from one end to the other, with a shape being a straight taper; wherein an outer diameter of the second model pole gradually increases and then tapers down from one end to the other, and shape thereof can be either a multi-segment straight taper or a curved taper.

Some of the additional aspects and advantages of the present application will be provided in the following description, and some will become apparent from the following description, or be appreciated through the implementation of the present application.

BRIEF DESCRIPTION OF FIGURES

The above and/or additional aspects and advantages of the present application will become apparent and easy to understand from the description of embodiments in conjunction with the following accompanying drawings.

REFERENCE NUMERALS IN THE DRAWINGS

Figure 1:
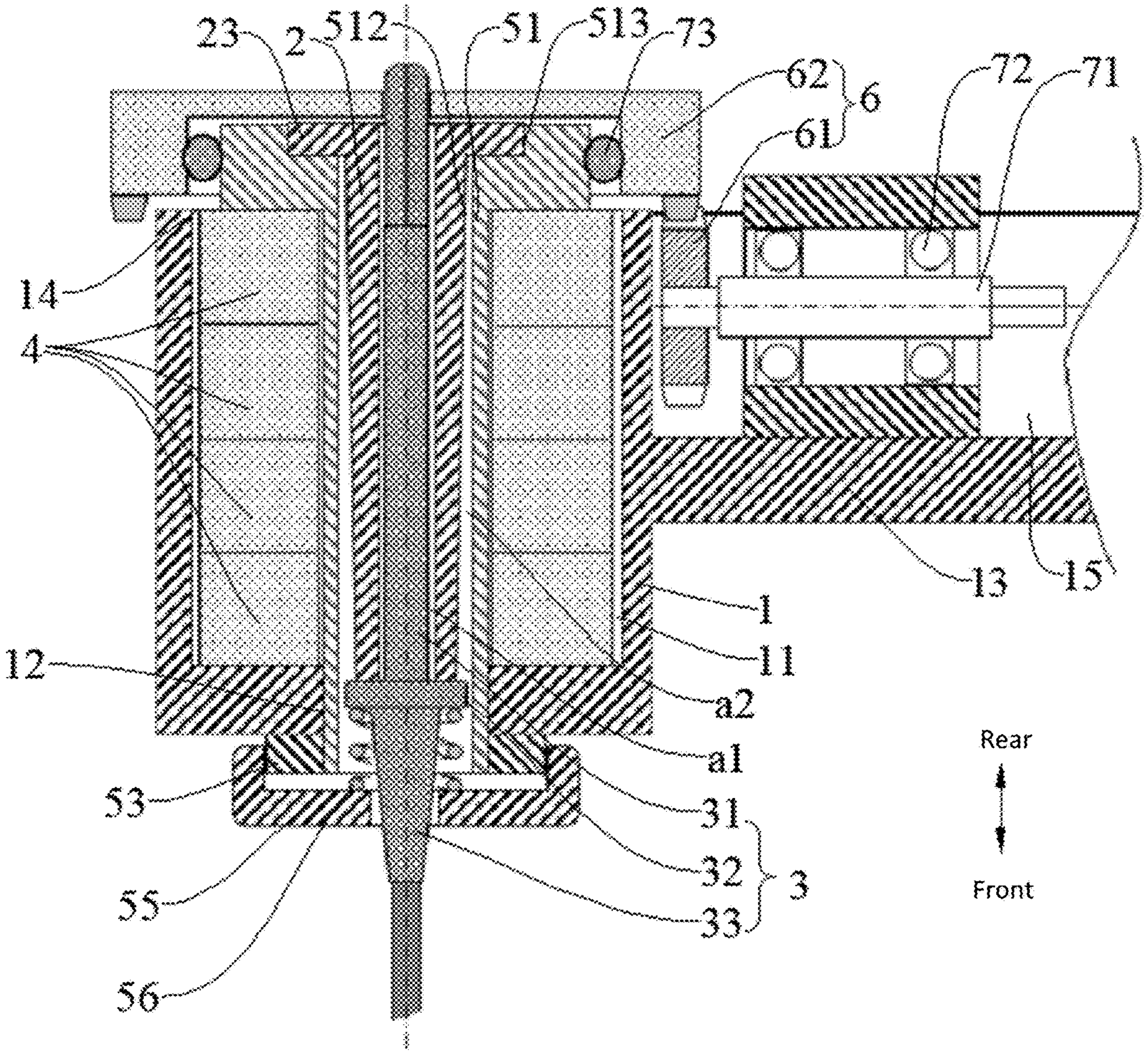
FIG. 1 is a schematic structural diagram of an ultrasonic vibration device in some embodiments of the present application.

Ultrasonic vibration device 100;

Shell 1, mounting cavity 11, mounting hole 12, handle connecting portion 13, rear opening 14, accommodating groove 15;

First amplitude-change pole 2, first flange 23;

Instrument rod 3, internal segment 31, step positioning segment 32, instrument amplitude-change pole segment 33, transmission segment 34;

Piezoelectric transducer 4;

Hollow locking rod 51, center hole 512, notch 513, pressure cover 53, pre-tightening cover 55, fitting hole 551, pressing elastic member 56;

Rotation transmission assembly 6, second gear 61, first gear 62, transmission hole 621;

Torque input shaft 71, second support bearing 72, first support bearing 73;

Second amplitude-change pole 8, second flange 83;

First gap a1, second gap a2;

First model pole 91, second model pole 92;

Instrument working portion 200.

DETAILED DESCRIPTION

The embodiments of the present application will be described in detail below, and the examples of the embodiments are illustrated in the accompanying drawings, throughout which the same or similar reference numerals represent same or similar elements or elements having same or similar functions. The embodiments described below with reference to the accompanying drawings are exemplary, are merely used for explaining the present application, and cannot be understood as limitations to the present application.

In the description of the present application, it should be understood that the orientations or positional relationships indicated by the terms “center”, “front”, “rear”, “vertical”, “horizontal”, “top”, “bottom”, “inner”, “outer”, “axial”, “radial”, etc. are orientation or positional relationship based on the accompanying drawings, are merely intended to facilitate the description of the present application and simplify the description, but not to indicate or imply that the device or element referred to must have a particular orientation or be constructed and operated in a particular orientation, and therefore, cannot be understood as limiting the present application. Unless otherwise specified, “plurality” means two or more.

In the description of the present application, it should be noted that unless otherwise specified and limited, the terms “mounted”, “connected”, and “connection” should be generally understood, for example, the “connection” may be fixed connection, detachable connection, integral connection, mechanical connection, electrical connection, direct connection, connection by a medium, or internal communication between two elements. Those of ordinary skill in the art can understand the specific meanings of the above terms in the present application according to specific circumstances.

A rotatable ultrasonic vibration device 100 according to the embodiments of the present application will be described below with reference to the accompanying drawings.

With reference to FIG. 1 to FIG. 4, the rotatable ultrasonic vibration device 100 according to the embodiments of the present application includes: a shell 1, a hollow locking rod 51, a first amplitude-change pole 2, an instrument rod 3, a piezoelectric transducer 4, and a rotation transmission assembly 6.

A mounting cavity 11 is disposed in the shell 1, a handle connecting portion 13 is disposed on the shell 1, and a mounting hole 12 in communication with the mounting cavity 11 is disposed on the shell 1. The hollow locking rod 51 is mounted in the mounting cavity 11, one end of the hollow locking rod 51 in a length direction faces the mounting hole 12, and the hollow locking rod 51 has a center hole 512 in its length direction.

The piezoelectric transducer 4 is mounted in the mounting cavity 11, the piezoelectric transducer 4 surrounds the hollow locking rod 51, and the hollow locking rod 51 fixes the piezoelectric transducer 4 in the shell 1.

The first amplitude-change pole 2 is mounted in the center hole 512, one end of the first amplitude-change pole 2 in a length direction is fixedly connected to the hollow locking rod 51, and at least a portion of the length of the first amplitude-change pole 2 is located in the space surrounded by the piezoelectric transducer 4.

The instrument rod 3 is directly or indirectly connected to the other end of the first amplitude-change pole 2 in the length direction, an instrument working portion 200 is located outside the shell 1 and connected to the instrument rod 3, and the instrument rod 3 is rotatable relative to the first amplitude-change pole 2.

The rotation transmission assembly 6 is rotatably mounted on the shell 1, and the rotation transmission assembly 6 is matched with the instrument rod 3 to transmit rotation torque to the instrument rod 3.

In the present application, the length directions of the hollow locking rod 51 and the first amplitude-change pole 2 are identical. For example, in FIG. 1, both the hollow locking rod 51 and the first amplitude-change pole 2 are long rods in a front-rear direction. For the convenience of description, the length directions of the hollow locking rod 51 and the first amplitude-change pole 2 are the front-rear direction as an example. A side, facing the instrument working portion 200, of the shell 1 is referred to as a front side, and an opposite side is referred to as a rear side. When the ultrasonic vibration device 100 is used for cleaning teeth, the instrument working portion 200 on the front side of the ultrasonic vibration device 100 faces the teeth.

As is well known to those skilled in the art, the core component of the piezoelectric transducer 4 is a piezoelectric wafer. The piezoelectric wafer can deform under pressure. As a result, the piezoelectric wafer is polarized, and positive and negative bound charges appear on the surface of the piezoelectric wafer, known as a piezoelectric effect. The piezoelectric effect is reversible, that is, deformation occurs after a voltage is applied to the piezoelectric wafer, and the reverse piezoelectric effect can generate ultrasonic waves. How to power on and control the piezoelectric wafer is well known in existing technologies and will not be elaborated here.

The first amplitude-change pole 2 of the present application is an ultrasonic amplitude transformer, which, as the name suggests, is a functional component that cooperates with the transducer to change the amplitude of ultrasonic vibration. Its main function is to change the amplitude of the piezoelectric transducer 4, increase a vibration velocity ratio, improve efficiency, and improve a mechanical quality factor. The transducer adjusts load matching between the transducer and the instrument working portion 200 by mounting the ultrasonic amplitude transformer, which reduces resonant impedance, so that the transducer works at a resonant frequency, the electro-acoustic conversion efficiency is improved, heat generation of the transducer is effectively reduced, and the service life is prolonged.

Therefore, when the ultrasonic vibration device 100 of the present application works, a voltage can be applied to the piezoelectric transducer 4, so that the piezoelectric transducer 4 deforms, vibrates, and generates ultrasonic waves. Because the hollow locking rod 51 locks the piezoelectric transducer 4 to the shell 1, the driving power of the piezoelectric transducer 4 can be output through a rear end of the hollow locking rod 51. The first amplitude-change pole 2 connected to the rear end of the hollow locking rod 51 further increases its amplitude under the action of ultrasonic waves, and the instrument working portion 200 connected to a front end of the first amplitude-change pole 2 vibrates violently, thereby improving the working performance.

In the present application, the shell 1 is disposed, the handle connecting portion 13 is disposed on the shell 1 to connect a handle body, and the weight of the shell 1 and the weight borne by the connection with the handle body enable the shell 1 to act as a mass balance block, thereby reducing the structural volume by canceling the mass balance block.

The present application does not limit the shape of the first amplitude-change pole 2. The first amplitude-change pole 2 may be a round pole or a square pole. Radial and axial directions here are defined by referring to the instrument working portion 200. The axis of the instrument working portion 200 serves as an axis of the ultrasonic vibration device 100, a direction along the axis is referred to as the axial direction, and a direction perpendicular to the axis is referred to as the radial direction.

The piezoelectric transducer 4 is disposed inside the shell 1, the piezoelectric transducer 4 surrounds a radial outer side of the first amplitude-change pole 2, the first amplitude-change pole 2 is a hollow pole, and the shell 1, the piezoelectric transducer 4, the hollow locking rod 51, the first amplitude-change pole 2, and the instrument rod 3 are arranged radially instead of linear arrangement of a mass balance block, a piezoelectric transducer, and an amplitude-change pole in the existing technologies. The radial arrangement in the present application is conducive to significantly reducing the axial length of the ultrasonic vibration device 100, saving space, and facilitating miniaturization design.

It can be understood that ultrasonic waves are radiation waves, and ultrasonic energy in an area enclosed by the piezoelectric transducer 4 is relatively concentrated, so in the present application, the piezoelectric transducer 4 surrounds the radial outer side of the first amplitude-change pole 2 to increase the ultrasonic energy received by the first amplitude-change pole 2, thereby increasing more amplitude under the action of ultrasonic waves, ensuring that the instrument working portion 200 can vibrate violently, and improving energy utilization efficiency.

The first amplitude-change pole 2 is a hollow pole with a relatively thin wall, making it easy for ultrasonic waves to penetrate. Additionally, the cross-sectional area of the first amplitude-change pole 2 decreases, making the first amplitude-change pole 2 more prone to vibration after receiving the ultrasonic waves, which is beneficial to increasing the vibration amplitude. The sleeve setting reduces the bending amplitude of the instrument rod 3 during vibration, and avoids easy separation due to excessive deformation at the connection between the first amplitude-change pole 2 and the instrument rod 3, thereby improving the reliability of the connection.

In some embodiments shown in FIG. 1, the mounting cavity 11 is disposed in the shell 1, the mounting hole 12 is disposed on the front side of the shell 1, and a rear end of the mounting hole 12 is connected to the mounting cavity 11, so the first amplitude-change pole 2, the hollow locking rod 51, and the piezoelectric transducer 4 can all be disposed in the mounting cavity 11. Optionally, a rear side of the mounting cavity 11 is open, that is, the rear side of the shell 1 is provided with a rear opening 14 to facilitate the assembly of parts such as the first amplitude-change pole 2, the hollow locking rod 51, and the piezoelectric transducer 4.

In the present application, a rear end of the first amplitude-change pole 2 is connected to the rear end of the hollow locking rod 51, and the front end of the first amplitude-change pole 2 is connected to the instrument working portion 200. The reverse arrangement of the first amplitude-change pole 2 is not only conducive to shortening the overall axial length of the ultrasonic vibration device 100, but also enables the vibration of the piezoelectric transducer 4, the hollow locking rod 51, the first amplitude-change pole 2, and the instrument working portion 200 to be transmitted sequentially, and the parts do not interfere with each other during the arrangement, thereby achieving compact and miniaturized arrangement of the parts.

In the present application, the rotation transmission assembly 6 is disposed, the rotation transmission assembly 6 cooperates with a rear end of the instrument rod 3 to transmit rotation torque to the instrument rod 3, the arrangement of the rotation transmission assembly 6 does not affect the arrangement of the instrument working portion 200, and the instrument rod 3 obtains a dual power source, thereby significantly increasing the vibration frequency and amplitude of the instrument rod 3 and improving the treatment effect.

In some embodiments, the piezoelectric transducer 4 may include layers of piezoelectric wafers, each layer of piezoelectric wafer surrounds the first amplitude-change pole 2 in a circular ring (or other ring) shape, and the layers of piezoelectric wafers are stacked axially. For example, the piezoelectric wafer in each layer may form a circular ring (or other ring) shape, or a plurality of block-shaped piezoelectric wafers may be included and sequentially spliced into a circular ring (or other ring) shape, without limitation here.

Figure 5:
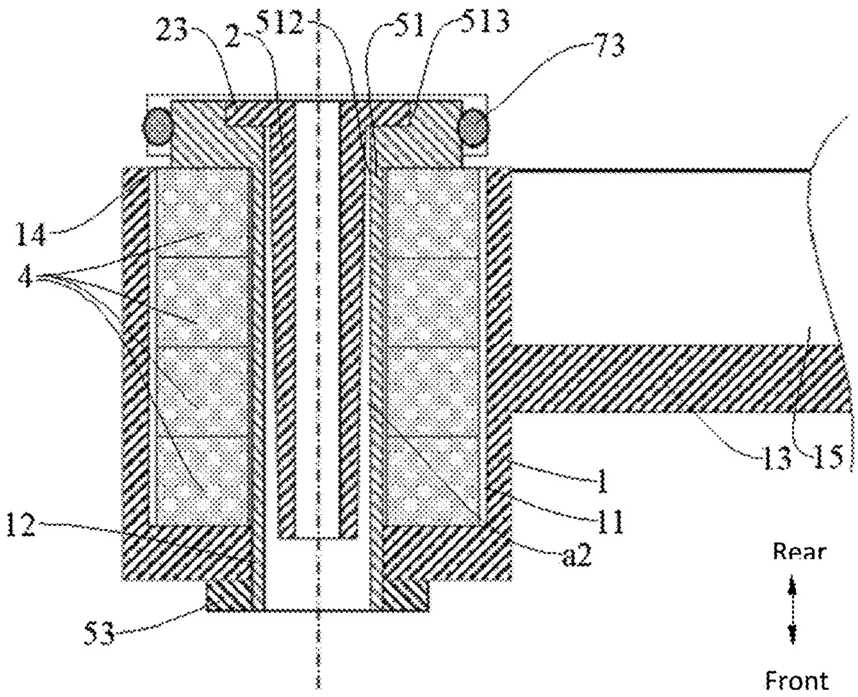
FIG. 5 is a partial structural diagram of the embodiments shown in FIG. 1.

In some embodiments, as shown in FIG. 1 and FIG. 5, the instrument rod 3 includes an internal segment 31 and a step positioning segment 32, the internal segment 31 is disposed in the first amplitude-change pole 2, one end of the internal segment 31 is fitted with the rotation transmission assembly 6, the step positioning segment 32 is connected to the other end of the internal segment 31 and located outside the first amplitude-change pole 2, the step positioning segment 32 abuts against a pole end of the first amplitude-change pole 2, and the instrument working portion 200 and the internal segment 31 are located on two opposite sides of the step positioning segment 32.

Figure 2:
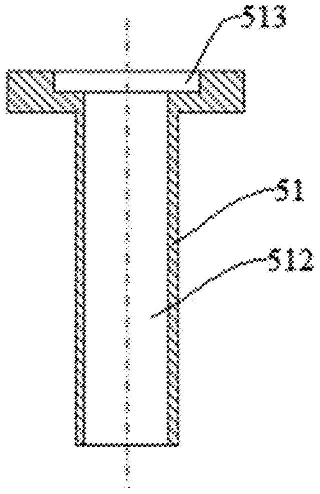
FIG. 2 is a schematic structural diagram of a hollow locking rod in some embodiments of the present application.
Figure 3:
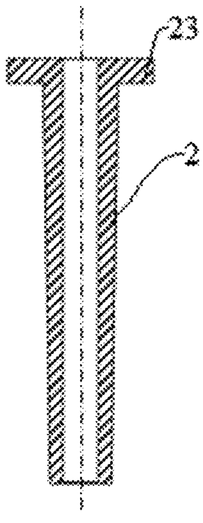
FIG. 3 is a schematic structural diagram of a first amplitude-change pole in some embodiments of the present application.

As shown in FIG. 2, the internal segment 31 is disposed in the first amplitude-change pole 2 in the front-rear direction, the rear end of the internal segment 31 is fitted with the rotation transmission assembly 6, and the step positioning segment 32 is connected to the front end of the internal segment 31 and located on the front side of the first amplitude-change pole 2. The step positioning segment 32 can facilitate positioning, increase the contact area between the instrument rod 3 and the first amplitude-change pole 2, and improve the axial bearing capacity of the first amplitude-change pole 2 for the instrument rod 3.

Figure 7:
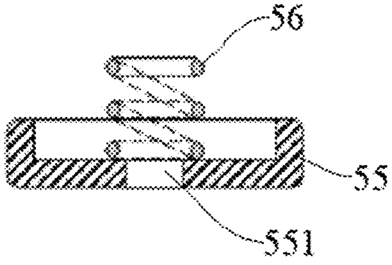
FIG. 7 is a schematic diagram of a matching relationship between a pre-tightening cover and a pressing elastic member in some embodiments of the present application.

For example, as shown in FIG. 1 and FIG. 7, the ultrasonic vibration device 100 further includes a pressing elastic member 56, and the pressing elastic member 56 is matched with the shell 1 and the instrument rod 3 respectively to press the step positioning segment 32 against the pole end of the first amplitude-change pole 2. Therefore, it can be ensured that the step positioning segment 32 is in close contact with the pole end of the first amplitude-change pole 2, so that the vibration and deformation of the first amplitude-change pole 2 can efficiently act on the instrument rod 3 to drive the instrument rod 3 to vibrate.

Figure 6:
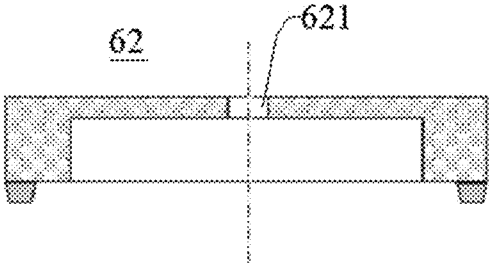
FIG. 6 is a schematic structural diagram of a first gear in some embodiments of the present application.

For example, as shown in FIGS. 1, 6, and 7, the ultrasonic vibration device 100 further includes a pre-tightening cover 55, and the pre-tightening cover 55 is located outside the mounting cavity 11 and connected to the shell 1. As shown in FIG. 1, the pre-tightening cover 55 is disposed on the front side of the shell 1.

The pre-tightening cover 55 is provided with a fitting hole 551, and one end of the instrument rod 3 extends out of the fitting hole 551. The pressing elastic member 56 is a spring, one end of the spring abuts against the pre-tightening cover 55 and the other end abuts against the step positioning segment 32. The setting can greatly improve the convenience of assembly, and the strong durability of the spring can further prolong its service life.

Further, as shown in FIGS. 1, 6, and 7, one end of the hollow locking rod 51 extends from the mounting hole 12 to the shell 1, the ultrasonic vibration device 100 further includes a pressure cover 53, and the pressure cover 53 is located outside the shell 1 and connected to the hollow locking rod 51 to clamp the piezoelectric transducer 4.

As shown in FIG. 1, the pressure cover 53 is disposed on the front side of the shell 1 and surrounds the mounting hole 12.

Optionally, the pre-tightening cover 55 is threaded to the pressure cover 53. The setting not only makes assembly easy, but also facilitates the disassembly of the pre-tightening cover 55 for subsequent maintenance and repair.

The instrument rod 3 in the solution of the present application may not be limited to being supported by the spring. Alternatively, a bearing (such as a thrust bearing) may be disposed between the first amplitude-change pole 2 and the instrument rod 3 to transmit the vibration of the first amplitude-change pole 2 to the instrument rod 3.

In some embodiments, the instrument rod 3 further includes an instrument amplitude-change pole segment 33, and the instrument amplitude-change pole segment 33 is located outside the first amplitude-change pole 2. For example, in FIG. 1, the instrument amplitude-change pole segment 33 is located on the front side of the first amplitude-change pole 2, and the instrument working portion 200 is rigidly connected to a front end of the instrument amplitude-change pole segment 33. Therefore, the instrument amplitude-change pole segment 33 has an amplitude-change function, and the vibration amplitude of the instrument working portion 200 can be further increased to improve the work efficiency of the instrument working portion 200.

For example, the instrument amplitude-change pole segment 33 is a tapered pole. Further, the instrument amplitude-change pole segment 33 is inserted in the fitting hole 551 of the pre-tightening cover 55.

For example, as shown in FIG. 1, the internal segment 31 is coaxial with the first amplitude-change pole 2, and there is a first gap a1 between an outer surface of the internal segment 31 and an inner surface of the first amplitude-change pole 2. In this way, there is the first gap a1 having a relatively uniform thickness on the periphery of the internal segment 31, and there is a bending activity space for the internal segment 31 in a 360-degree direction.

In some specific embodiments, as shown in FIG. 1 and FIG. 2, a notch 513 is disposed at one end of the hollow locking rod 51, and one end of the center hole 512 extends to the notch 513. A first flange 23 matched in the notch 513 is disposed at one end of the first amplitude-change pole 2, and the first flange 23 is rigidly connected to the hollow locking rod 51. The fitting between the first flange 23 and the notch 513 is utilized to connect the first amplitude-change pole 2 and the hollow locking rod 51, which not only increases the contact area between the two, but also enables axial and radial positioning between the two, thereby improving the firmness and reliability of connection and facilitating vibration transmission.

Further, as shown in FIG. 1, there is a second gap a2 between an outer surface of the first amplitude-change pole 2 and an inner surface of the hollow locking rod 51. The second gap a2 completely separates the first amplitude-change pole 2 from the hollow locking rod 51 except for the rear end, so that the two interfere with each other with little friction during vibration and deformation to reduce friction loss.

Further, as shown in FIG. 1, the ultrasonic vibration device 100 further includes a pressure cover 53, one end of the hollow locking rod 51 extends from the mounting hole 12 to the shell 1, and the pressure cover 53 is located outside the shell 1 and connected to the hollow locking rod 51 to clamp the piezoelectric transducer 4.

As shown in FIG. 1, the pressure cover 53 is disposed on the front side of the shell 1 and surrounds the mounting hole 12, and the front end of the hollow locking rod 51 is connected to the pressure cover 53. That is, the pressure cover 53 blocks the front side of the piezoelectric transducer 4, the hollow locking rod 51 blocks the rear side of the piezoelectric transducer 4, and the hollow locking rod 51 is inserted in the mounting hole 12 of the shell 1, so that the piezoelectric transducer 4 is locked in the shell 1 through the hollow locking rod 51 and the pressure cover 53, which improves the fixation and protection effect on the piezoelectric transducer 4.

Figure 4:
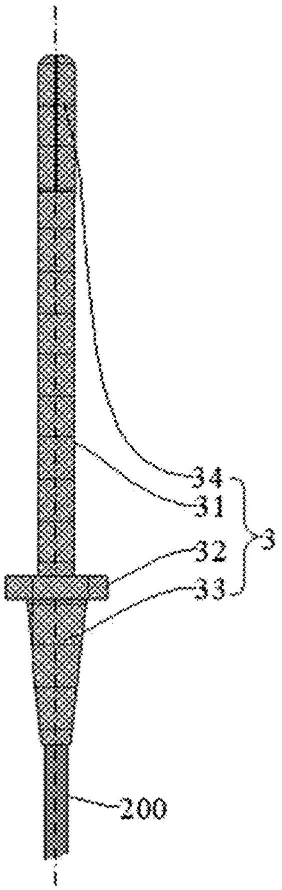
FIG. 4 is a schematic structural diagram of an instrument rod in some embodiments of the present application.

In some optional embodiments, the rotation transmission assembly 6 includes a first gear 62, and the first gear 62 is disposed on the hollow locking rod 51 through a first support bearing 73. As shown in FIG. 4, the rear end of the instrument rod 3 is a transmission segment 34. As shown in FIG. 6, a center of the first gear 62 is provided with a transmission hole 621 matched with the transmission segment 34, and the transmission hole 621 is a non-circular hole.

By setting the first gear 62, external power can transmit torque to the instrument rod 3 in a form of gear transmission, with high transmission efficiency, and a transmission ratio can be adjusted using a gear ratio.

For example, the handle connecting portion 13 is provided with an accommodating groove 15, the ultrasonic vibration device 100 further includes a torque input shaft 71, and a second gear 61 is supported in the accommodating groove 15 through a second support bearing 72. The rotation transmission assembly 6 further includes the second gear 61 connected to the torque input shaft 71, and the second gear 61 meshes with the first gear 62.

By setting the torque input shaft 71 and the second gear 61, the direction of torque transmission can be conveniently adjusted. The power source of the rotation transmission assembly 6 may be disposed in the handle body. When the handle connecting portion 13 is connected to the handle body, the power source on the handle transmits torque to the instrument rod 3 via the first gear 62 by means of the torque input shaft 71 and the second gear 61.

The purpose of this setting is to fully utilize the space of the handle connecting portion 13 to arrange the rotation transmission assembly 6, which is conducive to the miniaturization design of the device.

Optionally, axes of the first gear 62 and the second gear 61 are perpendicular, an outer edge of the first gear 62 surrounds the radial outer side of the hollow locking rod 51, and the first support bearing 73 is located between the outer edge of the first gear 62 and the hollow locking rod 51.

In summary, in the ultrasonic vibration device 100 as shown in FIG. 1, the piezoelectric transducer 4 is locked in the shell 1 through the hollow locking rod 51 and the pressure cover 53. The shell 1 is connected to the handle body through the handle connecting portion 13, and the shell 1 has a relatively large mass and can serve as a mass balance block.

During operation, the piezoelectric transducer 4 will generate strong vibration at the rear end of the hollow locking rod 51 when being excited. Further, the hollow first amplitude-change pole 2 is tightly and rigidly connected to the notch 513 on the hollow locking rod 51 through the first flange 23, so the first amplitude-change pole 2 can be driven to vibrate together.

In use, the instrument rod 3 is mounted in the hollow first amplitude-change pole 2 and locked by a pre-tightening cover 55, so that the step positioning segment 32 of the instrument rod 3 is tightly connected to the front end of the first amplitude-change pole 2. When the first amplitude-change pole 2 vibrates, the instrument rod 3 is driven to vibrate together.

The front end of the step positioning segment 32 on the instrument rod 3 is connected to the instrument amplitude-change pole segment 33, so that the vibration of the instrument working portion 200 connected to the front of the instrument rod 3 is further strengthened. The instrument rod 3 is rigidly connected to the instrument working portion 200.

The rotation transmission assembly 6 drives the instrument rod 3 to rotate, so that the instrument working portion 200 is in a dual motion form of rotation and vibration, thereby improving the treatment capability.

In the solution of the present application, the first amplitude-change pole 2 may not be limited to a hollow pole shown in FIG. 1, and the first amplitude-change pole 2 may alternatively be a solid pole.

In the solution of the present application, the first amplitude-change pole 2 may be directly connected to the instrument rod 3, or indirectly connected to the instrument rod 3 through a second amplitude-change pole 8.

Figure 8:
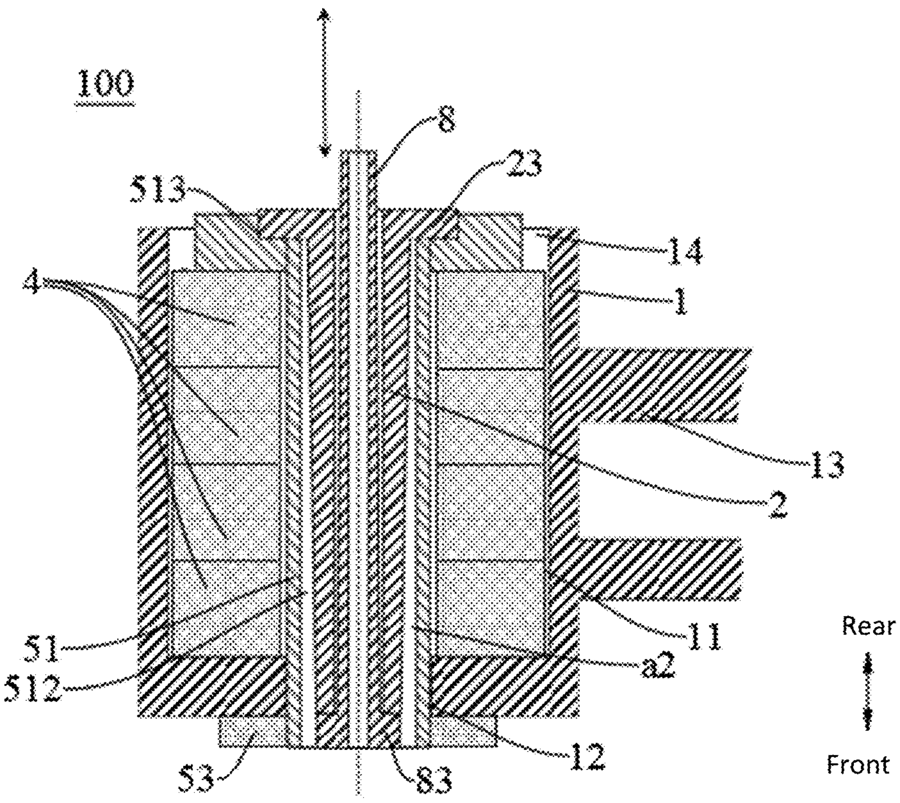
FIG. 8 is a schematic structural diagram of an ultrasonic vibration device in other embodiments of the present application when some parts are omitted.
Figure 9:
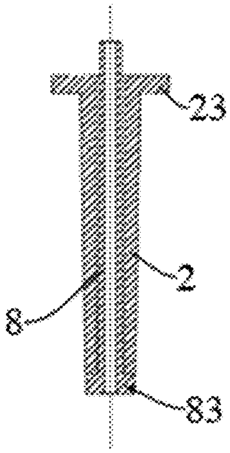
FIG. 9 is a schematic diagram of assembly of a first amplitude-change pole and a second amplitude-change pole in the embodiments shown in FIG. 8.

In some embodiments, as shown in FIG. 8 and FIG. 9, the first amplitude-change pole 2 is a hollow pole, the second amplitude-change pole 8 is mounted in the first amplitude-change pole 2, at least a portion of the length of the second amplitude-change pole 8 is located in the space surrounded by the piezoelectric transducer 4, and the instrument rod 3 is connected to the first amplitude-change pole 2 through the second amplitude-change pole 8. The second amplitude-change pole 8 can further increase the amplitude.

In the present application, one second amplitude-change pole 8 is disposed. The second amplitude-change pole 8 may be a solid pole or a hollow pole, and two ends of the second amplitude-change pole 8 in the length direction are rigidly connected to the first amplitude-change pole 2 and the instrument pole 3 respectively.

For example, a second flange 83 is disposed at one end of the second amplitude-change pole 8 in the length direction, and the second flange 83 is rigidly connected to the pole end of the first amplitude-change pole 2. The second amplitude-change pole 8 is connected by means of the second flange 83, which not only increases its contact area, but also can limit the second amplitude-change pole 8 axially and radially, thereby improving the firmness and reliability of connection and facilitating vibration transmission.

For example, materials for the first amplitude-change pole 2, the second amplitude-change pole 8, and the instrument amplitude-change pole segment 33 are not limited in the present application.

Cross-sectional shapes of the first amplitude-change pole 2, the second amplitude-change pole 8, and the instrument amplitude-change pole segment 33 are not limited in the present application. For example, they may be conical, catenary, Gaussian, Fourier, or other shapes.

For example, a pole portion of the first amplitude-change pole 2 is a first model pole 91 or a second model pole 92, or another model pole.

For example, a pole portion of the second amplitude-change pole 8 is a first model pole 91 or a second model pole 92, or another model pole.

For example, the instrument amplitude-change pole segment 33 is a first model pole 91 or a second model pole 92, or another model pole.

Figure 10:
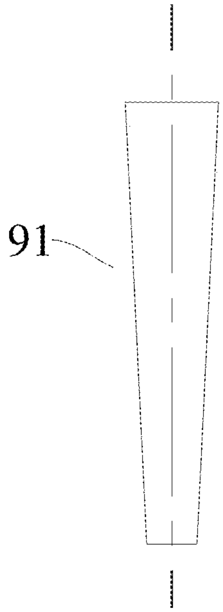
FIG. 10 is a schematic diagram of a shape of a first model pole in some embodiments.

Here, as shown in FIG. 10, an outer diameter of the first model pole 91 gradually decreases from one end to the other, commonly known as a tapered pole. Intersecting lines between a peripheral surface of the first model pole 91 and its axis plane are two straight lines, and the two straight lines gradually approach from one end to the other. The axis plane refers to a plane passing through an axis.

Figure 11A:
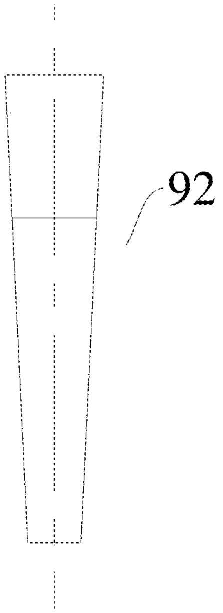
FIG. 11A is a schematic diagram of a shape of a multi-segment straight tapered second model pole in some embodiments.
Figure 11B:
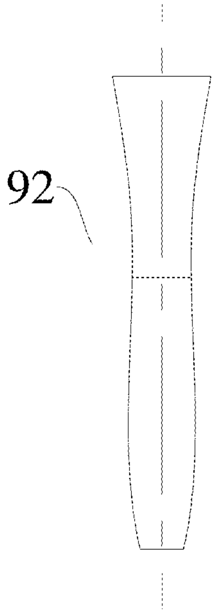
FIG. 11B is a schematic diagram of a shape of a curved tapered second model pole in some embodiments.

Here, an outer diameter of the second model pole 92 gradually increases and then decreases from one end to the other. As shown in FIG. 11A, the shape of the second model pole 92 may be a multi-segment straight taper, or as shown in FIG. 11B, the shape of the second model pole 92 is a curved taper. Intersecting lines between the peripheral surface of the first model pole 91 and its axis plane may be two broken lines or two curves. For example, each curve may be a parabola.

The ultrasonic vibration device 100 is beneficial for compact and miniaturized design, efficient and large-amplitude vibration and high-speed rotation of the instrument working portion 200 are ensured, the electro-acoustic conversion efficiency is improved, the heat generation of the ultrasonic vibration device 100 is reduced, and the service life is prolonged.

In the description of the specification, the reference terms "embodiment", "example", etc. indicate that the specific features, structures, materials, or characteristics described in conjunction with the embodiments or examples are included in at least one embodiment or example of the present application. In the specification, the schematic descriptions of the above terms do not necessarily refer to the same embodiment or example. Moreover, the described specific features, structures, materials or characteristics can be combined in any one or more embodiments or examples in a suitable manner.

Although the embodiments of the present application are shown and described, it can be understood by those of ordinary skill in the art that various changes, modifications, substitutions, and alterations can be made to these embodiments without departing from the principles and spirit of the present application. The scope of the present application is defined by the claims and equivalents thereof.

What is claimed is:

1. A rotatable ultrasonic vibration device comprising:

a shell with a mounting cavity in the shell, a handle connecting portion on the shell, and a mounting hole communicating with the mounting cavity;

a hollow locking rod mounted in the mounting cavity, with one end of the hollow locking rod in a length direction thereof facing the mounting hole, and having a center hole in the length direction;

a piezoelectric transducer mounted in the mounting cavity and surrounding the hollow locking rod, with the hollow locking rod fixing the piezoelectric transducer within the shell;

a first amplitude-change pole mounted in the center hole, fixedly connected to the hollow locking rod at one end of the first amplitude-change pole in a length direction thereof, and with at least a portion of the length of the first amplitude-change pole located in the space surrounded by the piezoelectric transducer;

an instrument rod, directly or indirectly connected to the other end of the first amplitude-change pole in the length direction thereof, with an instrument working portion located outside the shell and connected to the instrument rod, and the instrument rod being rotatably connected relative to the first amplitude-change pole; and a rotation transmission assembly rotatably mounted on the shell, matched with the instrument rod to transmit rotation torque to the instrument rod, wherein:

the instrument rod comprises an internal segment and a step positioning segment, wherein the internal segment is disposed within the first amplitude-change pole, with one end of the internal segment fitting with the rotation transmission assembly, wherein the step positioning segment is connected to the other end of the internal segment and is located outside the first amplitude-change pole, with the instrument working portion and the internal segment located on two opposite sides of the step positioning segment;

the ultrasonic vibration device further comprises a pressing spring, which is matched with the shell and the instrument rod, respectively, to press the step positioning segment against an end of the first amplitude-change pole; and the rotation transmission assembly comprises a first gear mounted on the hollow locking rod and a second gear meshing with the first gear, wherein a central transmission hole of the first gear is non-circular and engages with a transmission segment of the instrument rod.

2. The rotatable ultrasonic vibration device according to claim 1 further comprises a pre-tightening cover located outside the mounting cavity and connected to the shell, with a fitting hole through which an end of the instrument rod comprising the instrument working portion extends; and wherein one end of the pressing spring abuts against the pre-tightening cover and the other end abuts against the step positioning segment.

3. The rotatable ultrasonic vibration device according to claim 2, wherein another end of the hollow locking rod extends outside the shell, and the ultrasonic vibration device further comprises a pressure cover located outside the shell and fastened to the hollow locking rod to clamp the piezoelectric transducer, with the pre-tightening cover threadably engaged with the pressure cover to provide necessary pre-tightening force for the piezoelectric transducer.

4. The rotatable ultrasonic vibration device according to claim 1, wherein the instrument rod further comprises an instrument amplitude-change pole segment located outside the first amplitude-change pole, and wherein the instrument working portion is rigidly connected to the instrument amplitude-change pole segment.

5. The rotatable ultrasonic vibration device according to claim 1, wherein a notch is disposed at one end of the hollow locking rod, and one end of the center hole is continuous with the notch; and wherein a first flange is formed at said one end of the first amplitude-change pole, the first flange being disposed within the notch and is rigidly connected to the hollow locking rod.

6. The rotatable ultrasonic vibration device according to claim 1, wherein:

the internal segment of the instrument rod distant from the instrument working portion serves as the transmission segment; and wherein the first gear is mounted on the hollow locking rod via a first support bearing.

7. The rotatable ultrasonic vibration device according to claim 6, wherein the handle connecting portion is provided with an accommodating groove, and the ultrasonic vibration device further comprises a torque input shaft; and wherein the second gear is connected to the torque input shaft, and the second gear is supported by a second support bearing within the accommodating groove.

8. The rotatable ultrasonic vibration device according to claim 7, wherein axes of the first gear and the second gear are perpendicular to each other; and an outer periphery of the first gear surrounds a radial outer side of the hollow locking rod, and the first support bearing is located between the outer edge of the first gear and the hollow locking rod.

9. The rotatable ultrasonic vibration device according to claim 6, further comprises a pre-tightening cover located outside the mounting cavity and connected to the shell, with a fitting hole through which an end of the instrument rod comprising the instrument working portion extends; and wherein one end of the pressing spring abuts against the pre-tightening cover and the other end abuts against the step positioning segment.

10. The rotatable ultrasonic vibration device according to claim 6, wherein another end of the hollow locking rod extends outside the shell, and the ultrasonic vibration device further comprises a pressure cover located outside the shell and fastened to the hollow locking rod to clamp the piezoelectric transducer, with a pre-tightening cover threadably engaged with the pressure cover to provide necessary pre-tightening force for the piezoelectric transducer.

11. The rotatable ultrasonic vibration device according to claim 6, wherein the instrument rod further comprises an instrument amplitude-change pole segment located outside the first amplitude-change pole, and wherein the instrument working portion is rigidly connected to the instrument amplitude-change pole segment.

* * * * *